(12) United States Patent
Warner et al.

(10) Patent No.: US 8,344,853 B1
(45) Date of Patent: Jan. 1, 2013

(54) SECURE RFID SYSTEM AND METHOD

(75) Inventors: Janice Warner, Holmdel, NJ (US); Robert Warner, Holmdel, NJ (US); Jack Winters, Middletown, NJ (US)

(73) Assignee: Eigent Technologies, LLC, Holmdel, NJ (US)

( * ) Notice: Subject to any disclaimer, the term of this patent is extended or adjusted under 35 U.S.C. 154(b) by 1606 days.

(21) Appl. No.: 11/801,591

(22) Filed: May 7, 2007

Related U.S. Application Data

(60) Provisional application No. 60/800,912, filed on May 16, 2006.

(51) Int. Cl.
*H04Q 5/22* (2006.01)

(52) U.S. Cl. .................. 340/10.1; 340/10.3; 340/10.4

(58) Field of Classification Search ............ 340/572.1, 340/10.42
See application file for complete search history.

(56) References Cited

U.S. PATENT DOCUMENTS

| | | | | |
|---|---|---|---|---|
| 5,539,394 | A * | 7/1996 | Cato et al. ............... | 340/10.32 |
| 6,842,106 | B2 | 1/2005 | Hughes et al. | |
| 7,108,177 | B2 | 9/2006 | Brookner | |
| 2005/0033705 | A1 * | 2/2005 | Walmsley et al. ........... | 705/67 |
| 2005/0058292 | A1 | 3/2005 | Diorio et al. | |
| 2005/0123133 | A1 | 6/2005 | Stewart et al. | |
| 2006/0044115 | A1 * | 3/2006 | Doi et al. ................ | 340/10.42 |
| 2006/0169771 | A1 * | 8/2006 | Brookner ................ | 235/382 |

* cited by examiner

*Primary Examiner* — Brian Zimmerman
*Assistant Examiner* — Omer S Khan
(74) *Attorney, Agent, or Firm* — Porzio, Bromberg & Newman, P.C.

(57) ABSTRACT

The present invention relates to a system and method for providing security in an RFID system and provides a secure active RFID architecture that uses a combination of passive and active RFID circuitry and employs authentication and encryption techniques in the processing of data, at rest and over the air. In the method of communicating securely in an RFID system of the present invention, a random number is generated with the passive RFID circuitry. The random number is forwarded to a reader. The reader is authenticated by comparing a first hash value determined from a hash function of the random number generated at the RFID tag and an Authenticated Facility Group ID stored on the RFID tag with a second hash value determined from the hash function of the forwarded random number and an Authenticated Facility Group ID stored in the reader such that if the first hash value matches the second hash value the reader is authenticated. After the reader is authenticated, the tag ID stored at the RFID tag can be revealed. After authentication of the reader, a second layer of security using encryption is provided with the active RFID circuitry.

27 Claims, 3 Drawing Sheets

SECURE RFID SYSTEM AND METHOD

CROSS REFERENCE TO RELATED APPLICATION

This application claims the benefit of U.S. Provisional Patent Application No. 60/800,912, filed May 16, 2006, the entirety of which is hereby incorporated by reference into this application.

STATEMENT OF GOVERNMENT FUNDED RESEARCH

This invention was made with Government support under W91QUZ-06-C-0002 awarded by the US Army SBIR Program Office. The Government has certain rights in the invention.

BACKGROUND OF THE INVENTION

1. Field of the Invention

The present invention relates to a system and method for communicating securely in a system including Radio Frequency Identification (RFID) tags and RFID readers.

2. Description of Related Art

Security is as much an art as it is science and mathematics. The mathematics provides development of secure algorithms for authentication, encryption and hashing which are mathematically proven to withstand attempts of others to uncover the underlying secret. Industry tested algorithms are well known in the security community. The art of security is applying these algorithms in a way that withstands attempts of others to uncover the underlying secret while making the secret available to those that need it and are authorized to have it.

Security in the Wireless Fidelity—802.11 WLAN certified by the WiFi Alliance (WiFi) is illustrative of issues in security from implementation. With encryption and authentication technologies such as VPNs, WiFi Protected Access (WPA) and 802.11i, WiFi services are secure. On a technical level, the IEEE 802.11 standard solves the problems with wireless LAN security. However, the technical advances are not always implemented. Problems with WiFi security typically result from a failure to upgrade to the latest encryption and authentication technologies due to cost, complexity and/or logistics reasons.

Radio Frequency Identification (RFID) tags and the wireless infrastructure for tag communication have become technologies for providing in-transit visibility for military and commercial logistics pipelines. Active RFID technology consists of battery powered RFID tags with resident data ($128k$) operating at unlicensed short-range commercial frequencies and a supporting infrastructure of interrogating antennas and handheld readers at hundreds of logistic nodes worldwide. RFID privacy and security breaches are known to occur world-wide.

U.S. Pat. No. 6,842,106 describes a system for securing communications in an RFID system comprised of sending, from the reader, a message to the tag; the tag, in response to the message, generating a challenge value and sending that challenge value back to the reader. The reader and the tag simultaneously perform a mathematical operation on the challenge value, the reader sends the challenge reply and the tag compares the challenge reply to its own computation. If they match, the reader is authenticated to the tag. Challenge-response authentication schemes like this one are well known to the industry. The patent has the limitation that it does not make use of the added security of user-defined reader group authentication codes at the point of origin or the knowledge of the prior read location for masking the tag information even after reader authentication has occurred. In addition, the patent does not provide any protection against eavesdropping in the area of an authenticated reader because the tag information is not masked once a reader is authenticated.

U.S. Pat. No. 7,108,177 describes the use of a secured or unsecured RFID tag as a means of identifying a user and allowing the user access to online resources if he or she brings the RFID device into RF range of the interrogating device. This is much like a "RF" password or access card. It also does not address secure communication between an RFID tag and a reader.

U.S. Patent Application Publication No. 2005/0058292 describes methods and apparatuses for providing secure two-way RFID communication by encrypting the RF carrier signal by modulating it with signals unknown to an unintended or unauthorized recipient (e.g., noise). A tag receives the noise-encrypted RF signal and backscatter modulates it with tag information. The noise encryption makes the tag information unreadable by eavesdroppers.

U.S. Patent Application Publication No. 2005/0123133 describes methodology and circuitry for the secure exchange of random numbers through the use of a unique tag password, which can correspond to the tag serial number, that is also known to the reader; for authenticating a data source using cyclical redundancy check (CRC) on encrypted data; for generating a seedless pseudo-random number; and for generating data encryption coding with variable clocking.

The above described patents concern using RFID devices as access tokens or implementing security technology on RFID systems such as through standard industry challenge response mechanisms, through the availability of RF noise, and through the use of random number exchanges and passwords, CRC and variable clocking mechanisms.

While security algorithms are well known in the industry, means of cost efficiently and technology-effectively implementing them has hampered their application. It is desirable to provide an improved method and system for providing comprehensive security in an RFID system.

SUMMARY OF THE INVENTION

In considering alternative secure active RFID strategies, each of the security threats listed below were considered in evaluating the efficacy of the method of the present invention with regard to confidentiality: monitoring of response to track location of items; monitoring of response to track movement of items and learn supply route; monitoring of beacon to track location of items; monitoring of beacon to track movement of items and learn supply route; hijacking of shipments based on knowledge of content/sources; compromise of vendor/retailer/partner/ally locations and identity though their possession of RFID-tagged items; RFID-targeted sabotage based on a specific shipment or shipments from a particular supplier to disrupt critical cargo movement; and frequencies employed by a particular RFID device, with or without a beacon, are potentially a flag to competitors and adversaries that certain cargo is being transported. Each of the security threats listed below were considered in evaluating the efficacy of the method of the present invention with regard to integrity: modification of response to create misinformation about actual items present; replay of RFID responses to confuse tracking systems and destruction of RFID tags (e.g., physically or by electrostatic discharge (ESD)). Each of the security threats listed below were considered in evaluating the efficacy of the method of the present invention with regard to availability: jamming of probing signal; jamming of response; and draining of battery through repeated probing. These are example threats that apply within the active RFID supply chain.

The present invention relates to a system and method for providing security in an RFID system and provides a secure active RFID architecture that uses a combination of passive and active RFID circuitry and employs authentication and encryption techniques in the processing of data, at rest and over the air. The passive RFID circuitry security is the frontend of the entire active RFID security protocol of the present invention. It is the gateway to the data and, as such, it is useful that the protocol fits with the current and future use profiles for logistics systems, processes and practices.

The secure RFID system comprises a reader and an RFID tag. The RFID tag can comprise passive RFID circuitry and active RFID circuitry. An Authenticated Facility Group ID is established as an ID of all authorized RFID equipment within a group determined by an authorized entity. In the method of communicating securely in an RFID system of the present invention, a random number is generated with the passive RFID circuitry. The random number is forwarded to the reader. The reader is authenticated by comparing a first hash value determined from a hash function of the random number generated at the RFID tag and the Authenticated Facility Group rD stored on the RFID tag with a second hash value determined from the hash function of the forwarded random number and an Authenticated Facility Group ID stored in the reader such that if the first hash value matches the second hash value the reader is authenticated. After the reader is authenticated, the tag ID stored at the RFID tag can be revealed.

One major benefit of the architecture of the secure RFID system of the present invention is that the readers and tag ID are authenticated without any battery depletion. Another benefit of the architecture is that unlike a conventional unsecured passive tag which would return its tag ID, the passive circuit in the secure active RFID tag of the present invention returns a random number.

After authentication of the reader, a second layer of security using encryption is provided with the active RFID circuitry. If there is a need to perform frequent, long-range container searches certain data elements may be left unencrypted at rest to conserve processing cost. Even when certain data elements are not encrypted at rest, this information can not be accessed without first going through the passive circuitry security of the present invention. Therefore, even unencrypted data at rest is protected. If there is no need for frequent access to tag data, it can be encrypted at rest. The decipherment processing load can be afforded in this process due to the numerous battery saving measures employed, such as the use of passive circuitry to carry much of the security load.

The invention will be more fully described by reference to the following drawings.

DETAILED DESCRIPTION

Figure 1:
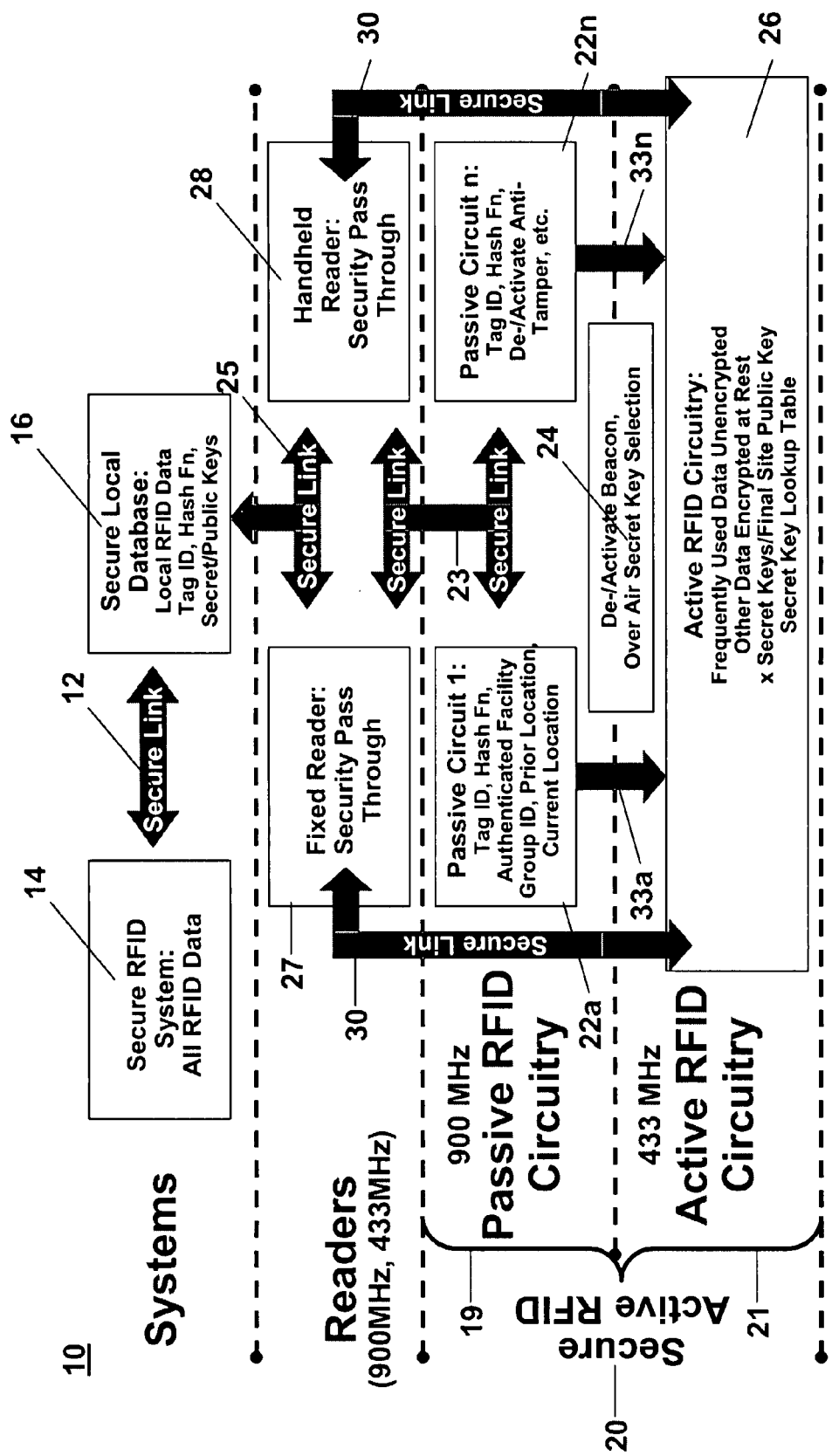
FIG. 1 is a schematic diagram of a secure RFID system in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Secure RFID system 10 comprises secure RFID data system 14 and secure local database 16. Secure link 12 connects secure RFID data system 14 and secure local database 16. Secure RFID data system 14 stores RFID data. Secure local database system 16 stores local RFID data, tag identification (ID) data, a secure hash function, and a secret key associated with a site specific public key. Data in secure RFID data system 14 and secure local database system 16 is readily accessible to ensure access to the tag identification (ID) and any data on the tag under all circumstances.

Secure RFID system 10 includes secure active RFID tag 20. Secure active RFID tag 20 includes passive RFID circuitry 19 and active RFID circuitry 21. In one embodiment, passive RFID circuitry 19 operates at 900 MHZ and active RFID circuitry 21 operates at 433 MHZ. It will be appreciated to one skilled in the art that the teachings of the present invention can operate at other frequencies.

Passive RFID circuitry 19 can comprise one or more passive RFID circuits 22a-22n. Passive RFID circuits 22a-22n include a secure tag ID hashing protocol for revealing an RFID tag ID, which is described in detail below. Secure tag ID hashing protocol provides a first level of defense of secure RFID system 10. Passive RFID circuits 22a-22n can be used to also update an authenticated facility group ID, prior location code and/or current location code.

Secure link 23 wirelessly connects passive RFID circuits 22a-22n to fixed reader 27 and/or handheld reader 28. Passive RFID circuits 22a-22n can be used to wirelessly authenticate fixed reader 27 and/or handheld reader 28 and the RFID tag ID is then revealed securely through passive RFID circuits 22a-22n. At this point, among other possibilities, active RFID beacon 24 can be activated and an over the air secret key can be revealed. Secure link 25 connects fixed reader 27 and/or handheld reader 28 to secure local database system 16.

Once fixed reader 27 and/or handheld reader 28 is authenticated and the RFID tag ID is shared via the secure RFID tag ID hashing protocol, a second layer of security is provided with active RFID circuitry 21. Secure link 30 wirelessly connects fixed reader 27 to active RFID circuitry 21 and/or secure link 30 wirelessly connects handheld reader 28 to active RFID circuitry 21. Secure links 33a-33n connect respective passive RFID circuits 22a-22n to active RFID circuitry 21.

In one embodiment for encrypting data over the air, secret key cryptography is used by active RFID circuit 26. In a public key/private key system, a user has a pair of keys, either of which may be used to encrypt or decrypt a document. The public key is published or distributed in a manner that reasonably ensures that the key in fact belongs to the key owner, and the private key is kept strictly secret. Secret key cryptography has the advantage of reduced processing load. However, it should be noted that the trade off for the reduced processing load is that secret key cryptography can become compromised if the secret key resident on secure active RFID tag 20 is revealed. To mitigate this vulnerability, it is proposed to employ a set of secret encryption keys on secure active RFID tag 20. The secret encryption key applicable to a particular site will be selected at the site through passive RFID circuitry 19 signaling after first going through passive RFID circuitry 19 described above.

Active RFID circuitry 21 can store certain data elements encrypted at rest. For example, data elements which are not accessed frequently can be encrypted at rest. In one embodiment, data elements which are frequently used are unencrypted at rest. Encrypting data at rest can be implemented in one of two ways. In a first method, a secret encryption key can be provided to secure local database 16 encrypted with a site specific public key associated with the destination site which is stored with the encrypted data in active RFID circuitry 21. The encrypted secret key can only be decrypted using a site specific private key stored in secure local database 16. The secret key is stored in active RFID circuitry 21 in the already encrypted form so that it can not be retrieved if the RFID tag is compromised. This assumes that the data is generally only necessary at its destination point since it is encrypted with the public key of the destination (final site). The implementation of the secret key encryption for transfer over the air with public key cryptography has the characteristic of being more secure by being more difficult to compromise. If the data is required at an intermediate point or the destination point changes, then the destination site private key can be provided to the intermediate point through a secure back channel. Once the secret key is decrypted at secure local database 16 using the site specific private key, it can be used to further decrypt the data that had been encrypted at rest and stored on the active RFID circuitry once it is transmitted to fixed reader 27 and/or handheld reader 28 and passed to secure local database 16.

In a second method, the secret key to decrypt the encrypted data at rest stored on active RFID circuitry 21 can be a system wide secret key which is stored at secure local databases 16 at every secure site. The encrypted data is decrypted once it is transferred from the active RFID circuitry to fixed reader 27 and/or handheld reader 28 and then onto secure local database 16. Secret key cryptography has a lower processing load, but has increased vulnerability of the secret key being unknowingly revealed. The system wide secret key would be known by all possible logistic sites so if the data is required at an intermediate point or the destination point changes, then it could be easily accessed. A system wide secret key can potentially present less administrative concerns and no need to additionally implement public key security but it can be compromised at any one of the sites.

Figure 2:
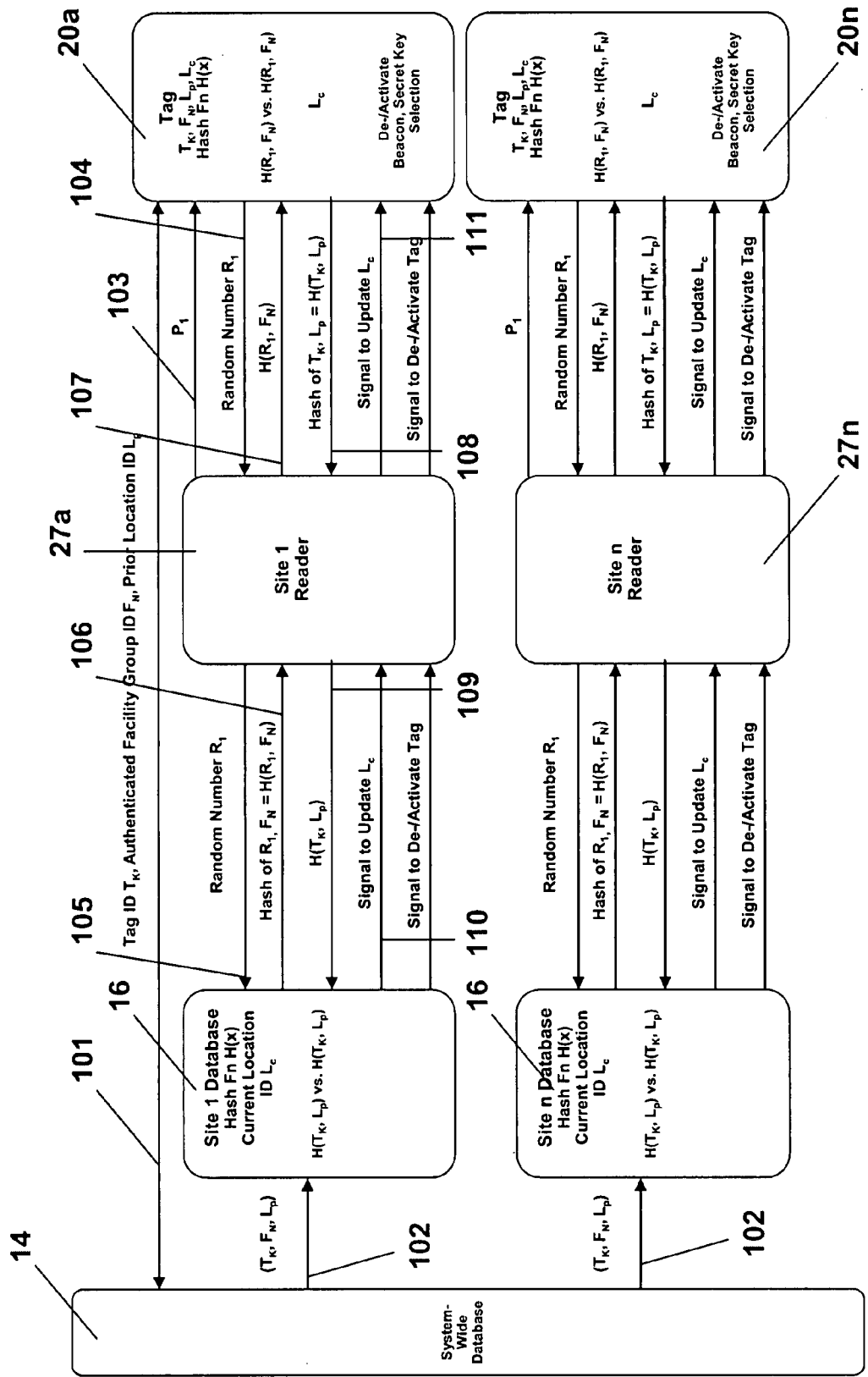
FIG. 2 is a schematic diagram of a secure tag ID hashing protocol used on the secure RFID system.

FIG. 2 illustrates the secure tag ID hashing protocol with the process steps starting at the top and proceeding in sequence from top to bottom. The process begins at the initial writing to secure active RFID tag 20a, where tag ID ($T_K$), Authenticated Facility Group ID ($F_N$) and Prior Location ($L_p$) are all stored on secure active RFID tag 20a and uploaded into secure RFID data system 14 on path 101. Secure RFID data system 14 then transfers the information to all the applicable secure local databases 16 at logistics sites along planned supply paths on paths 102. The Authenticated Facility Group ID ($F_N$) is the ID of all authorized RFID equipment within a group determined by an authorized entity. The group can be defined to be any size. In one embodiment, a smaller group size encompassing readers in supply/distribution locations within two hours transporting time of each other is preferred to provide more control of the RFID authentication process. It is preferred that closely spaced logistics sites are provided the same $F_N$ to ensure a smooth reader authentication process. A new $F_N$ can be written to secure active RFID tag 20 at any time, but it will only be necessary to write a new $F_N$ to secure active RFID tag 20 when, and if, its next logistics check point is located within a differently defined $F_N$. The Prior Location, $L_p$, is the location site ID for the last previous logistics checkpoint that secure active RFID tag 20 passed before arriving at its current location. At the initial writing of secure active RFID tag 20, prior location, $L_p$,=current location, $L_c$.

At any site, to gain access to any information within secure active RFID tag 20, one or more of readers 27a-27n will transmit probe $P_1$ to one or more secure active RFID tags 20a-20n at the passive frequency along path 103. The same secure ID hashing protocol is used at each of the one or more readers 27a-27n. The following is a description referring to one reader 27a and one secure active RFID tag 20a. Unlike a conventional unsecured passive tag which could return its tag ID, the passive circuit in secure active RFID tag 20a returns a random number $R_1$ along path 104. Reader 27a passes the random number $R_1$ to secure local database 16a along path 105. Secure local database 16a hashes random number $R_1$ with Authentication Facility Group ID, $F_N$, assigned to the local site, $H(R_1, F_N)$. Secure active RFID tag 20a does the same and hashes the random number $R_1$ with the $F_N$, $H(R_1, F_N)$. The hash of the random number with $F_N$, $H(R_1, F_N)$, from path 106 is then transferred via reader 27a along path 107 to the secure active RFID tag 20a. Secure active RFID tag 20a compares the hashes. If they match, reader 27a is authenticated and secure active RFID tag 20a sends a hash of its tag ID, $T_K$, with the prior location, $L_p$, $H(T_K, L_p)$ along path 108 to reader 27a. Reader 27a forwards it to secure local database 16a along path 109 where the actual tag ID, $T_K$, is determined. By nature of a recognizable hash response, secure active RFID tag 20a authenticates itself to reader 27a and secure RFID data system 14. If the hashes do not match, reader 27a discontinues communications with secure active RFID tag 20a assuming that it is not authentic. In the preferred embodiment, at site exit, secure local database 16a sends its current location ID, $L_c$, and transfers it along path 110 via authenticated reader 27a to secure active RFID tag 20a along path 111 to be stored and used as the Prior location, $L_p$ at the next logistics site and the secure active RFID tag is deactivated through the passive circuitry for transport. The purpose of hashing the tag ID, $T_K$, with the prior location, $L_p$, is to make the hash containing $T_K$ unique at every site to mitigate the possibility of monitoring the hash of the tag ID (second response to a reader) in order to track location and movement of material or to learn supply routes. Location IDs are updated at every logistics site.

Figure 3:
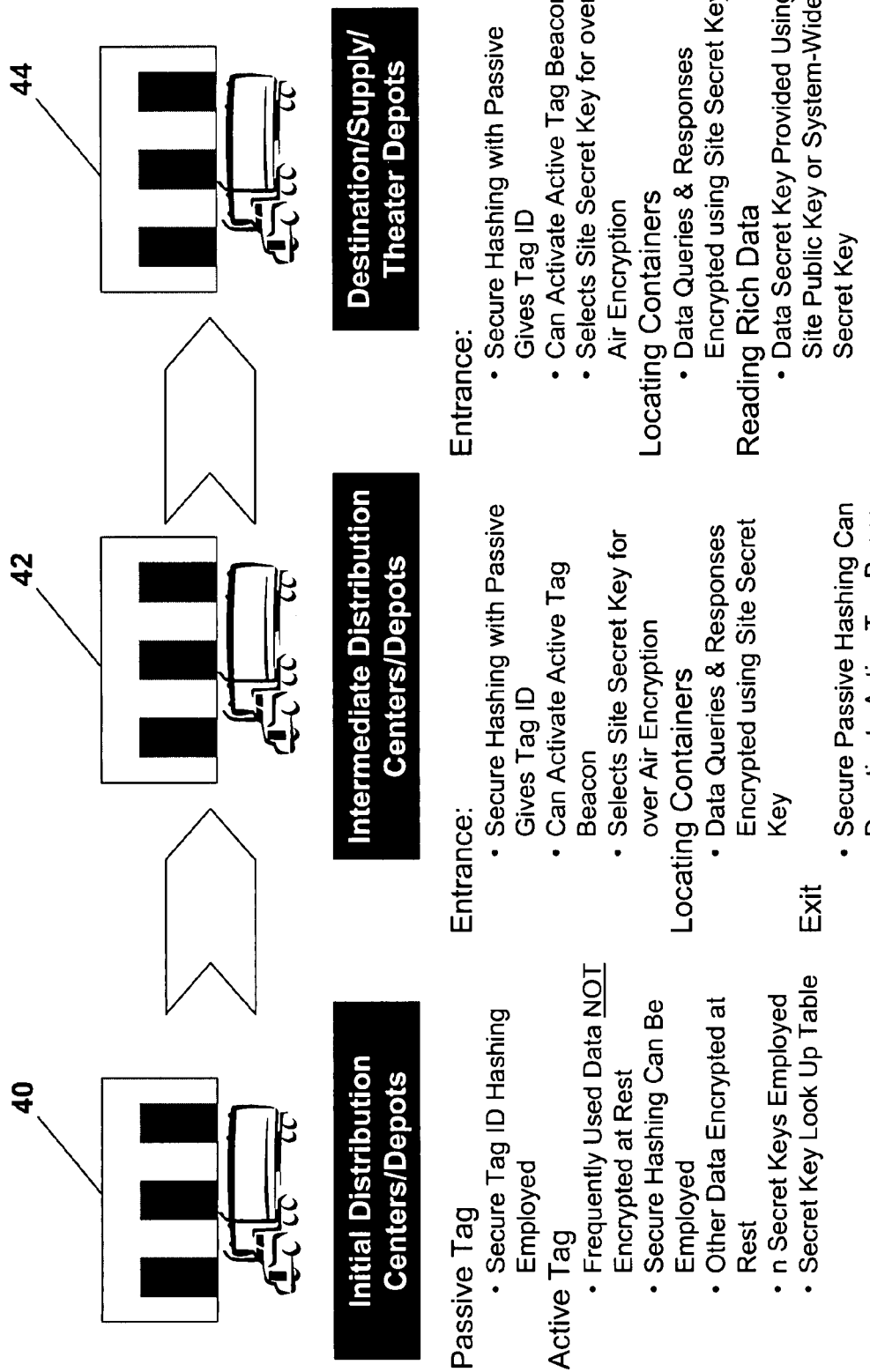
FIG. 3 is a schematic diagram of implementation of the secure RFID system and secure tag ID hashing of the secure RFID system and secure tag ID hashing protocol in a logistics environment.

FIG. 3 illustrates implementation of the secure tag ID hashing protocol in a logistics environment. At the time of container loading and the initial active RFID tag write event at the initial distribution centers/depots 40, the information is secured on the passive tag associated with the container or goods as described above and the information is also uploaded to the secure RFID data system. The security techniques include the secure tag ID hashing protocol on the passive tag. On the active tag circuitry, additional and/or optional security techniques can be implemented that include: employing the same secure hashing on the active circuits as has been described for the passive circuits; separating frequently used data and not encrypting it at rest from data not frequently used and encrypted at rest if continuous power consuming access if required; employing secret keys; and employing a secret key look up table. At intermediate distribution centers/depots 42 as well as at the final destination 44, the secure hashing protocol with the passive circuitry provides the RFID tag ID. The RFID tag ID in the majority of cases is all that is required. If all the cargo information is in the secure local database and an inventory grid in the depot has been established and the inventory process is proceeding in an orderly fashion such that there is no apparent need to use the long-range identification capability of the active RFID system to locate cargo, then whether at the beginning, middle or end of the supply chain, the process can end without use of the active RFID at this site. Alternatively, if special circumstances require access to data on the active tag, then the active tag beacon can be activated through the passive circuitry and the site secret key for over the air encryption of the data can be selected. Reading the encrypted data can be accomplished at final destination 44 in one of two ways as previously described. Upon exit, or if the capability is no longer required, the active tag beacon can be deactivated at intermediate centers/depots 42 and final destination 44. The active tag beacon is securely deactivated when not required in a storage yard or in transit to keep the active RFID transponder hardened against monitoring.

The security protocol described above for the passive circuitry provides a "defense in depth" security architecture for an active RFID transponder and can be implemented on stand-alone passive RFID devices. For dedicated supply logistics usage such as for a certain retail chain, the security algorithm can be managed by the IT department at the retail chain. For cross-platform, cross-company, cross-entity or cross-industry usage, the security algorithm can be managed as a service by an independent third party to ensure security and privacy from point of manufacture to final consumption.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method of communicating securely in an RFID system, said RFID system comprising a reader and one or more RFID tags, the one or more RFID tags comprising passive RFID circuitry operating at a passive frequency, said method comprising the steps of:
   transmitting a probe from the reader to the one or more RFID tags at the passive frequency;
   generating a random number at the one or more RFID tags with the passive RFID circuitry, the one or more RFID tags including information of a tag ID, Authenticated Facility Group ID and Prior Location, the Authenticated Facility Group ID is the ID of all authorized RFID equipment within a group determined by an authorized entity, the Prior Location is a location site ID for a last previous logistics checkpoint that the one or more RFID tags passed before arriving at its current location;
   forwarding the random number and the information to the reader, the reader comprises a local database connected securely to the reader wherein a hash function, the Authenticated Facility Group ID and the location of the reader are stored at the local database
   authenticating the reader by comparing a first hash value determined from the hash function of the random number generated at the one or more RFID tags and an Authenticated Facility Group ID stored on the one or more RFID tags with a second hash value determined from the hash function of the forwarded random number and an Authenticated Facility Group ID stored in the reader, wherein if the first hash value matches the second hash value the reader is authenticated and the one or more RFID tags sends a hash of its tag ID with the Prior Location to the reader, the reader forwards the hash of its tag ID with the Prior Location to the local database where the actual tag ID is determined, if the reader is authenticated performing the steps of:
   forwarding to the reader a third hash value determined from the hash function of a tag ID stored at the one or more RFID tags and a Prior Location stored at the one or more RFID tags; and
   determining the tag ID at the reader from the forwarded third hash value,
   forwarding a current location ID of the reader to the one or more RFID tags and storing the forwarded current location ID as the Prior Location stored at the one or more RFID tags.

2. The method of claim 1 wherein the one or more RFID tags further comprises active RFID circuitry and further comprising the step of:
   encrypting data elements of the one or more RFID tags which are not accessed frequently using the active RFID circuitry.

3. The method of claim 2 wherein said step of encrypting comprises encrypting the data elements which are not accessed frequently with a secret encryption key and encrypting the secret encryption key with a public key of a destination site.

4. The method of claim 3 further comprising the steps of decrypting the encrypted secret key at the destination site using a private key of the destination site; and
   decrypting the encrypted data elements of the one or more RFID tags.

5. The method of claim 3 wherein the secret encryption key is determined by activating an active RFID beacon and revealing the secret encryption key.

6. The method of claim 2 wherein said step of encrypting comprises encrypting the data elements which are not accessed frequently with a system wide secret key wherein the encrypted data elements of the one or more RFID tags are decrypted with a system wide secret key stored in the secure local database.

7. The method of claim 1 wherein the one or more RFID tags further comprises active RFID circuitry and further comprising the step of:
   leaving unencrypted data elements of the one or more RFID tags which are frequently accessed with the active RFID circuitry.

8. A system for communicating securely in an RFID system, said RFID system comprising a reader and one or more RFID tags, the one or more RFID tags comprising passive RFID circuitry operating at a passive frequency, said system comprising:
   means for transmitting a probe from the reader to the one or more RFID tags at the passive frequency;
   means for generating a random number at the one or more RFID tags with the passive RFID circuitry, the one or more RFID tags including information of a tag ID, Authenticated Facility Group ID and Prior Location, the Authenticated Facility Group ID is the ID of all authorized RFID equipment within a group determined by an authorized entity, the Prior Location, is a location site ID for a last previous logistics checkpoint that the one or more RFID tags passed before arriving at its current location;
   means for forwarding the random number and the information to the reader, the reader comprises a local database connected securely to the reader wherein a hash function, the Authenticated Facility Group ID and the location of the reader are stored at the local database,
   means for authenticating the reader by comparing a first hash value determined from a the hash function of the random number generated at the one or more RFID tags and an Authenticated Facility Group ID stored on the one or more RFID tags with a second hash value determined from the hash function of the forwarded random number and an Authenticated Facility Group ID stored in the reader, wherein if the first hash value matches the second hash value the reader is authenticated and the one or more RFID tags sends a hash of its tag ID with the Prior Location to the reader, the reader forwards the hash of its tag ID with the Prior Location to the local database where the actual tag ID is determined, if the reader is authenticated performing:

means for forwarding to the reader a third hash value determined from the hash function of a tag ID stored at the one or more RFID tags and a Prior Location stored at the one or more RFID tags; and means for determining the tag ID at the reader from the forwarded third hash value, means for forwarding a current location ID of the reader to the one or more RFID tags and storing the forwarded current location ID as the Prior Location stored at the one or more RFID tags.

9. The system of claim 8 wherein the one or more RFID tags further comprises active RFID circuitry and further comprising:

means for encrypting data elements of the one or more RFID tags which are not accessed frequently using the active RFID circuitry.

10. The system of claim 9 wherein said means for encrypting comprises encrypting data elements which are not accessed frequently with a secret encryption key and wherein the secret key is stored in encrypted form using a public key of a destination site and the encrypted data is decrypted by the destination site by first decrypting the secret key using a site specific private key and then using the secret key to decrypt the data elements of the one or more RFID tags.

11. The system of claim 10 wherein the secret encryption key is determined by means for activating an active RFID beacon and revealing the secret encryption key.

12. The system of claim 11 wherein said means for encrypting comprises encrypting the data elements which are not accessed frequently with a system wide secret key wherein the encrypted data is decrypted with the system wide secret key stored in the secure local database.

13. The system of claim 8 wherein the one or more RFID tags further comprises active RFID circuitry and further comprising:

means for leaving unencrypted data elements of the one or more RFID tags which are frequently accessed by the active RFID circuitry.

14. A method for providing security in a system for distributing goods comprising the steps of:

associating one or more RFID tags with the goods, said one or more RFID tags comprising passive RFID circuitry operating at a passive frequency; and authenticating a reader at an initial distribution center by the steps of:

transmitting a probe from the reader to the one or more RFID tags at the passive frequency;

generating a random number at the one or more RFID tags with the passive RFID circuitry at the initial distribution center, the one or more RFID tags including information of a tag ID, Authenticated Facility Group ID and Prior Location, the Authenticated Facility Group ID is the ID of all authorized RFID equipment within a group determined by an authorized entity, the Prior Location, is a location site ID for a last previous logistics checkpoint that the one or more RFID tags passed before arriving at its current location;

forwarding the random number and the information to the reader, the reader comprises a local database connected securely to the reader wherein a hash function, the Authenticated Facility Group ID and the location of the reader are stored at the local database at the initial distribution center; and comparing a first hash value determined from the hash function of the random number generated at the one or more RFID tags and an Authenticated Facility Group ID stored on the one or more RFID tags with a second hash value determined from the hash function of the forwarded random number and an Authenticated Facility Group ID stored in the reader at the initial distribution center, wherein if the first hash value matches the second hash value the reader at the initial distribution center is authenticated and the one or more RFID tags sends a hash of its tag ID with the Prior Location to the reader, the reader forwards the hash of its tag ID with the Prior Location to the local database where the actual tag ID is determined, if the reader is authenticated performing the steps of:

forwarding to the reader a third hash value determined from the hash function of a tag ID stored at the one or more RFID tags and a Prior Location stored at the one or more RFID tags; and determining the tag ID at the reader from the forwarded third hash value, forwarding a current location ID of the reader to the one or more RFID tags and storing the forwarded current location ID as the Prior Location stored at the one or more RFID tags.

15. The method of claim 14 further comprising the steps of:

forwarding the goods to an intermediate distribution center/depot and/or destination/supply depot; and authenticating a reader at the intermediate distribution center/depot and/or destination/supply depot by the steps of:

generating a random number at the RFID tag with the passive RFID circuitry;

forwarding the random number to the reader at the intermediate distribution center/depot and/or destination/supply depot; and comparing a first hash value determined from a hash function of the random number generated at the RFID tag and an Authenticated Facility Group ID stored on the RFID tag with a second hash value determined from the hash function of the forwarded random number and an Authenticated Facility Group ID stored in the reader at the intermediate distribution center/depot and/or destination/supply depot;

wherein if the first hash value matches the second hash value the reader at the intermediate distribution center/depot and/or destination/supply depot is authenticated.

16. The method of claim 14 wherein if the reader at the initial distribution center is authenticated further comprising the steps of:

forwarding to the reader at the initial distribution center a third hash value determined from the hash function of a tag ID stored at the RFID tag and a Prior Location stored at the RFID tag; and determining the tag ID at the reader at the initial distribution center from the forwarded third hash value.

17. The method of claim 15 wherein if the reader at the intermediate distribution center/depot and/or destination/supply depot is authenticated further comprising the steps of:

forwarding to the reader at the intermediate distribution center/depot and/or destination/supply depot a third hash value determined from the hash function of a tag ID stored at the RFID tag and a Prior Location stored at the RFID tag; and determining the tag ID at the reader at the intermediate distribution center/depot and/or destination/supply depot from the forwarded third hash value.

18. The method of claim 14 wherein the one or more RFID tags further comprises active RFID circuitry and further comprising the step of:
  encrypting data elements of the one or more RFID tags which are not accessed frequently using the active RFID circuitry.

19. The method of claim 18 wherein said step of encrypting comprises encrypting the data elements which are not accessed frequently with a secret encryption key and then encrypting the secret key with a public key of the destination site wherein the encrypted secret key is decrypted at the destination site using the private key of the destination site and once decrypted, the encrypted secret key is used to decrypt the encrypted data elements of the one or more RFID tags.

20. The method of claim 18 wherein the secret encryption key is determined by activating an active RFID beacon and revealing the secret encryption key.

21. The method of claim 18 wherein said step of encrypting comprises encrypting the data elements which are not accessed frequently with a system wide secret key wherein the encrypted data is decrypted with a system wide secret key stored in a secure local database.

22. The method of claim 14 wherein the one or more RFID tags further comprises active RFID circuitry and further comprising the step of:
  leaving unencrypted data elements of the one or more RFID tags which are frequently accessed with the active RFID circuitry.

23. The method of claim 15 wherein the one or more RFID tags further comprises active RFID circuitry and further comprising the step of:
  encrypting data elements of the one or more RFID tags which are not accessed frequently using the active RFID circuitry.

24. The method of claim 23 wherein said step of encrypting comprises encrypting the data elements which are not accessed frequently with a secret encryption key and then encrypting the secret encryption key with a public key of the destination site wherein the encrypted secret key is decrypted at the destination site using a private key of the destination site and once decrypted, the secret encryption key is used to decrypt the encrypted data elements of the one or more RFID tags.

25. The method of claim 24 wherein the secret encryption key is determined by activating an active RFID beacon and revealing the secret encryption key.

26. The method of claim 23 wherein said step of encrypting comprises encrypting the data elements which are not accessed frequently with a system wide secret key wherein the encrypted data is decrypted with a system wide secret key stored in a secure local database.

27. The method of claim 23 wherein the one or more RFID tags further comprises active RFID circuitry and further comprising the step of:
  leaving unencrypted data elements of the one or more RFID tags which are frequently accessed with the active RFID circuitry.

* * * * *